Oct. 23, 1945.  R. R. BOTTOMS ET AL  2,387,231
FRACTIONATING COLUMN
Filed May 28, 1943
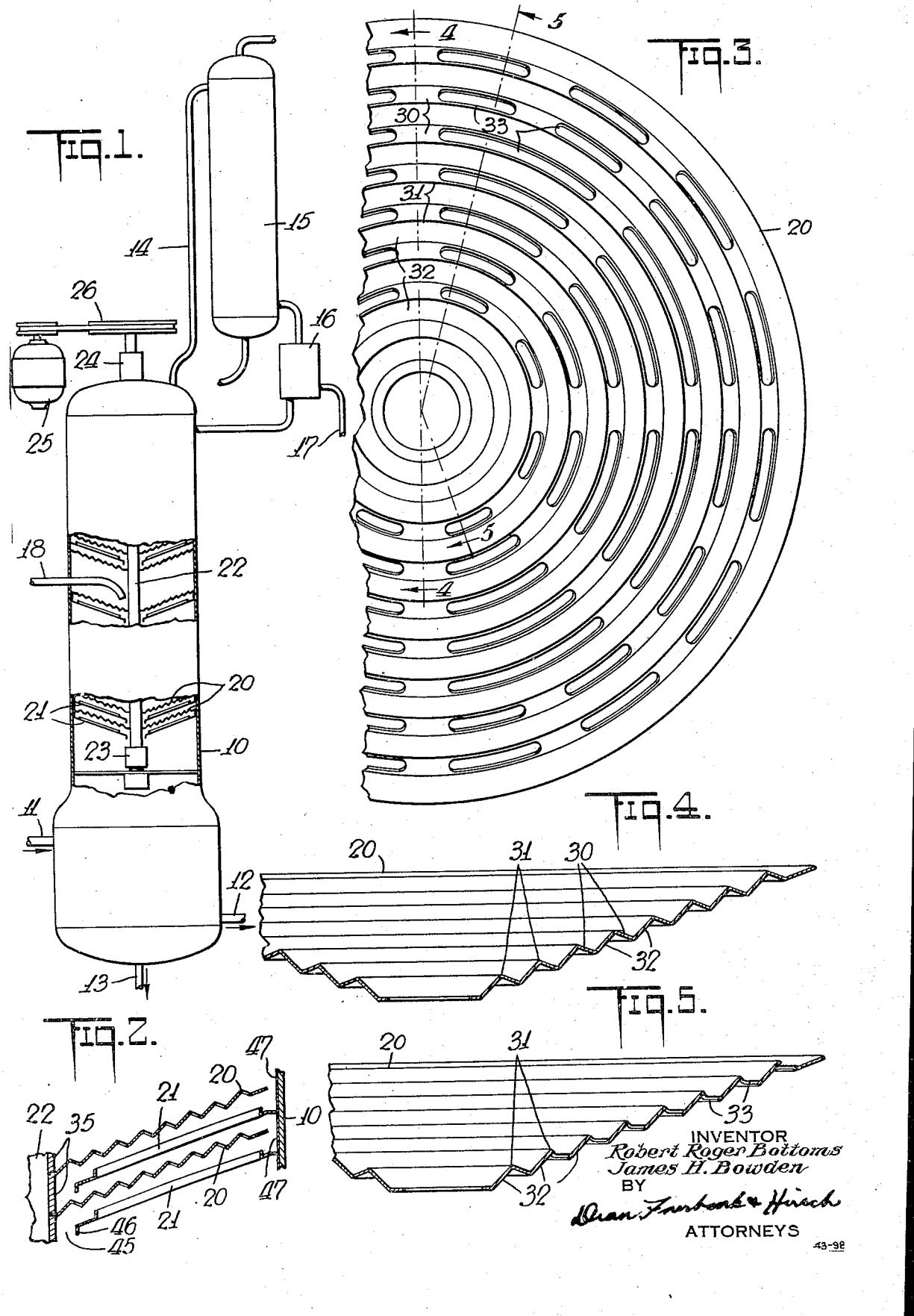

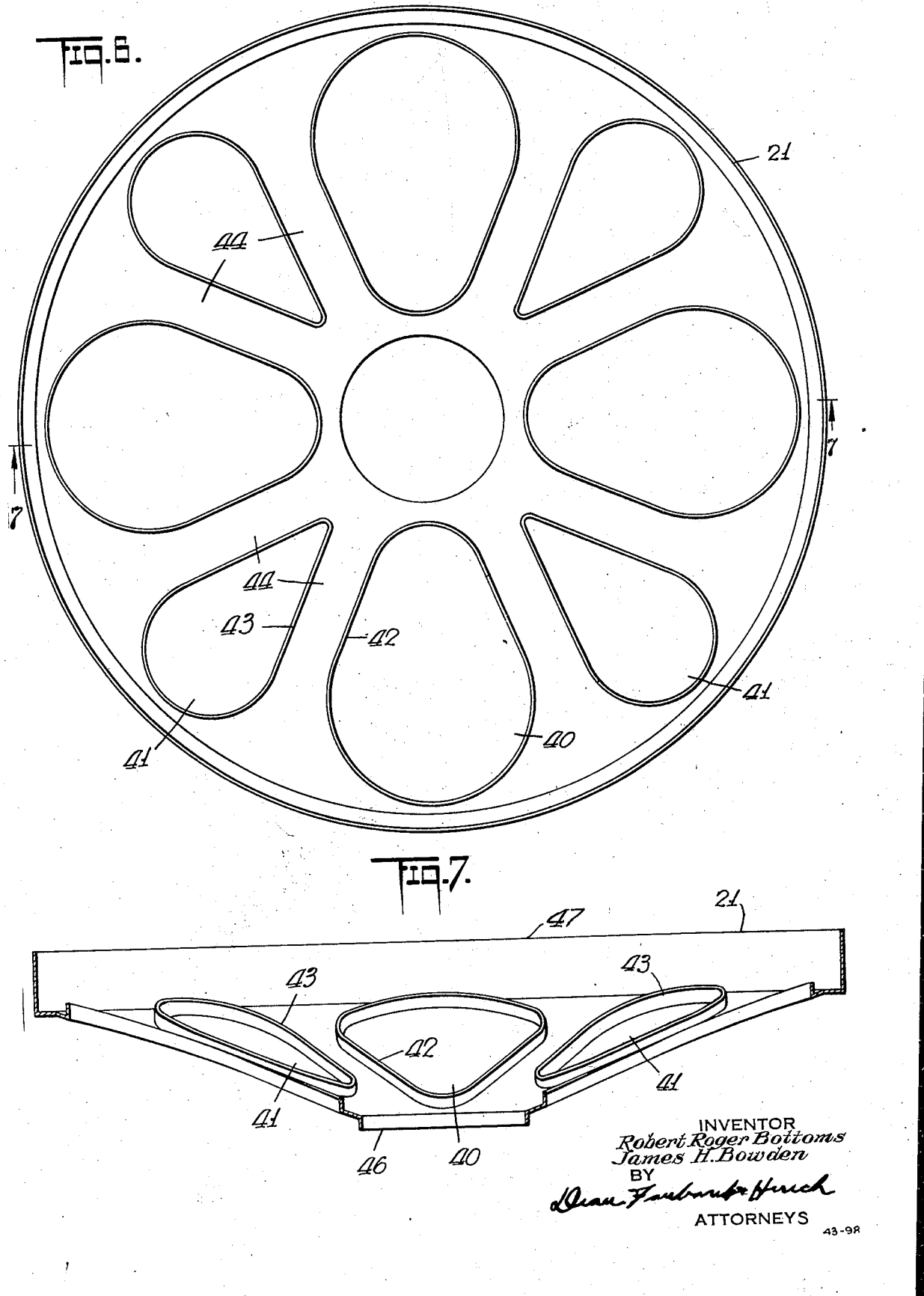

Patented Oct. 23, 1945

2,387,231

UNITED STATES PATENT OFFICE 2,387,231

FRACTIONATING COLUMN

Robert Roger Bottoms, Crestwood, and James H. Bowden, Louisville, Ky., assignors to National Cylinder Gas Company, Chicago, Ill., a corporation of Delaware Application May 28, 1943, Serial No. 488,918

8 Claims. (Cl. 261—89)

The present invention relates to improvements in fractionating or rectifying columns, and one object is to increase the capacity of such a column without increasing its size.

Another object is to provide a new and improved fractionating column affording greater contact between the liquid and vapors, and greater counterflow path to increase the separation efficiency of the column.

As a feature of the present invention, the fractionating or distillation column has a series of stationary trays and rotary trays alternately arranged in superposed relationship. The rotary trays are conical or otherwise dished, and are corrugated or stepped to form a series of annular troughs separated by annular ridges. Each trough is provided with an annular row of holes or slots for upward passage of vapor therethrough. The liquid delivered near the center of each rotary tray is centrifuged outwardly along said tray and is spilled in minutely divided form over the crest of the ridges and across the slots or holes through which the vapors pass, thereby affording effective contact of vapor and liquid across the slot at every corrugation. This effects rapid attainment of equilibrium as to evaporation and condensation between the liquid and the vapor without any tendency to back diffusion.

The stationary trays serve as drip or drain pans for the purpose of collecting the liquid at the outside of the column and returning it to the center of the next lower rotating tray. These stationary trays are desirably apertured or of skeleton form to permit free upflow of gases therethrough with a minimum of resistance.

Various other objects, features and advantages of the invention will be apparent from the following particular description, and from an inspection of the accompanying drawings, in which Fig. 1 is a view of a fractionating column embodying the present invention, and shown in side elevation with part of its shell broken away to expose part of the internal structure in vertical section;

Fig. 2 is an enlargement of a portion of the interior of the column of Fig. 1 shown in vertical section;

Fig. 3 is a fragmentary top plan view of one of the rotary trays employed in the fractionating column of the present invention;

Figs. 4 and 5 are sections taken on lines 4—4 and 5—5 respectively of Fig. 2;

Fig. 6 is a top plan view of the stationary drain tray employed in the fractionating column of the present invention; and Fig. 7 is a section of the stationary drain tray taken along line 7—7 of Fig. 6.

Referring to the drawings, the invention is shown applied to a fractionating tower or column for separating a liquid into constituents of different boiling points. In such a column, the more volatile portions of the fluid ascend through the column, and may be delivered to a condenser, while the less volatile substances descend towards the bottom of the column.

Referring more particularly to Fig. 1, one embodiment of the invention is shown as a part of a distillation column having a vertical cylindrical shell 10 containing at the bottom a heater with an inlet 11 and an outlet 12. A discharge 13 is provided at the bottom for the less volatile liquid. At the upper end of the shell 10, a connection 14 for the fractionated vapors leads to a condenser 15, the condensate from which passes through a look box 16, and may be diverted to an outlet 17 as a final low boiling product, or may be returned to the top of the column as a reflux.

The liquid to be distilled is introduced into the intermediate section of the column through a feed inlet 18 having its discharge end near the axis of said column. All of the features may be of conventional form, and considered per se form no novel portion of the invention.

Disposed in the interior of the column are rotary trays 20 and stationary trays 21 alternately arranged in superposed relationship. The trays 20 are rotated by a vertical shaft 22 extending axially of the shell 10, and supported as for example by an internal thrust bearing 23 at the lower end, and an external bearing 24 with a stuffing box near its upper end. This shaft 22 may be driven in any suitable manner, as for example, from a motor 25, and a chain or rope drive 26.

Each of the rotary trays 20 is conical or otherwise downwardly dished, and is corrugated or stepped to form annular ridges 31 forming troughs therebetween. The corrugations are desirably formed so that the side 32 of each ridge 31 nearest the center of the tray is inclined upwardly and radially outwardly to facilitate the centrifugal upward movement of the liquid over the tray with minimum flow disturbances, and outer side 30 of each ridge is inclined in the opposite direction and at a somewhat steeper angle.

Each of the troughs is provided with a series of spaced openings 33 desirably in the form of arcuate slots on the side 30 of each ridge farthest away from the center of the tray to permit passage of the ascending vapor.

The rotary trays 20 are supported in any suitable way on the shaft 22 for rotation therewith. For example, there may be provided a series of spacing rings or sleeves 35 snugly fitting the shaft 22, and serving to clamp the inner peripheral rims of the rotary trays 20 between adjacent rings. These rings 35 may be retained in fixed position against axial movement along the shaft 22 by any suitable means, as for example, by an abutment collar pinned to said shaft at one end of the series of spacing rings 35, and a second clamping collar threaded to said shaft at the other end of said series of rings and bearing against said rings.

The stationary trays 21 serve to collect the liquid at the outside of the column and return it to the center of the next lower rotary tray 20. For that purpose, these stationary trays 21 are conical or otherwise dished with their concave sides facing upwardly, and are desirably supported so as to extend substantially parallel with the intervening rotary trays 20. These fixed trays 21 are provided with openings to permit free upward flow of the gases therethrough with a minimum of resistance. For that purpose, each of the stationary trays 21 is formed with a series of large openings 40 and smaller openings 41 in substantially ovate form extending radially of the tray with the width of the openings progressively increasing in outward radial direction, and with the ends curved so that the flow of the liquid around these openings is somewhat streamlined. To prevent the liquid from flowing downwardly through these openings, the peripheries thereof are provided with upstanding rims 42 and 43.

The openings 40 and 41 are shown of different sizes alternately arranged to afford the largest amount of opening areas compatible with required rigidity, and to define around said openings flow channels 44 of substantially uniform width throughout their length.

Each of the stationary trays 21 is provided with a central opening affording an annular space 45 between the margin of said opening and the periphery of the shaft 22 or of the spacing rings 35, if such are provided. A downward flange or apron 46 is desirably formed around the periphery of the central opening to serve as a dam for the down flow of the liquid towards the next lower rotary tray 20.

The stationary trays 21 are preferably supported by outer cylindrical rims 47 snugly engaging the inner periphery of the shell, and serving as seats for the next fixed trays 21 above. These rims 47 thereby serve not only to seat the fixed trays 21, but also serve to interspace them in desired axial relationship.

Each of the trays 20 and 21 is desirably made of one piece and is shaped, as for example, by stamping.

In the operation of the column, the liquid mixture to be fractionated is introduced into the column through the feed inlet 18 in the intermediate section of the column, and is heated in the base of the column to drive off the lighter fractions which pass up through the descending liquid. The descending liquid delivered near the center of each of the rotary trays 20 is centrifuged outwardly across said trays in the form of a thin film, and as it passes over the crest of a corrugation, it is thrown by centrifugal force across the trough onto the side 32 of the next ridge. At the same time, the vapors from below pass upwardly through these openings 33 and through the film thrown across the trough, and thereby come into intimate contact with the liquid moving across above the slots. Thus, lighter fractions of the liquid are vaporized and heavier fractions of the vapors are condensed. The stationary trays 21 drain any condensed vapors with any reflux liquid that may be employed through the channels 44 and towards their centers for discharge onto the center of the next lower rotary tray 20. The vapors from the rotary trays 20 pass upwardly unobstructed through the openings 40 and 41 of the stationary trays 21 into contact with liquid on the rotary trays above.

What is claimed is:

1. In a fractionating column, the combination comprising a shell, and a series of downwardly dished trays coaxially arranged in said shell in superposed relationship, and annularly corrugated to define alternate ridges and troughs, each of said trays having a series of annularly arranged apertures in each of their troughs, and means for rotating said trays in unison.

2. A fractionating column having a shell, a series of conical trays coaxially arranged in said shell in superposed relationship with their concave sides facing upwardly, each of said trays being corrugated to form alternate annular troughs and ridges, the sides of each ridge nearest the center being inclined upwardly and radially outwardly, while the adjacent sides are provided with apertures spaced therealong, and means for rotating said trays in unison about a substantially vertical axis.

3. A fractionating column having a shell, a series of conical trays coaxially arranged in said shell in superposed relationship with their concave sides facing upwardly, each of said trays being corrugated to form alternate annular troughs and ridges, the sides of each ridge nearest the center being inclined upwardly and radially outwardly, while the adjacent sides are oppositely inclined at a steeper angle and provided with apertures spaced therealong, and means for rotating said trays in unison about a substantially vertical axis.

4. A fractionating column having a shell, and stationary trays and rotary trays alternately arranged in superposed relation, downwardly dished and provided with apertures, said rotary trays being annularly corrugated to define alternate ridges and troughs, and the apertures of the stationary trays being larger than those of the rotary trays.

5. A fractionating column having a shell, and stationary trays and rotary trays alternately arranged in superposed relation, downwardly dished and provided with apertures, said rotary trays being annularly corrugated to define alternate ridges and troughs, the apertures of the rotary trays being on the sides of the ridges away from the center, and the apertures of the stationary trays elongated radially thereof.

6. A fractionating column having a shell, stationary trays and rotary trays alternately arranged in superposed relation in said shell, said rotary trays being conical with peripheral edges uppermost, each of said rotary trays being corrugated to form alternate annular troughs and ridges, the sides of each ridge nearest the center being inclined upwardly and radially outwardly, while the outer sides are provided with annular rows of spaced apertures, and means for rotating said rotary trays in unison about a substantially vertical axis.

7. A fractioinating column having a shell, and conical stationary trays and conical rotary trays alternately arranged in superposed relationship in said shell, with their smaller sections at the bottom, said stationary trays having a series of openings provided with upwardly extending rims, to form channels for the drainage of liquid towards the center of said trays, and said rotary trays being provided with annular rows of openings up through which gas may pass and across which liquid may flow radially.

8. A fractionating column having a shell, stationary trays and rotary trays alternately arranged in superposed relationship in said shell, and of conical form with their walls slanting inwardly and downwardly, the rotary trays being annularly corrugated, one side of each corrugation having a series of annularly arranged apertures, and said stationary trays having apertures rimmed to form channels therearound for the drainage of liquid towards the center of said stationary trays.

ROBERT ROGER BOTTOMS.
JAMES H. BOWDEN.